Nov. 2, 1965     H. D. BRAUN     3,215,180

FOOD CHOPPER

Filed April 22, 1963     3 Sheets-Sheet 1

INVENTOR.
HERBERT D. BRAUN
BY Marshall, Wilson & Yeasting
attorneys

Nov. 2, 1965  H. D. BRAUN  3,215,180
FOOD CHOPPER
Filed April 22, 1963  3 Sheets-Sheet 2
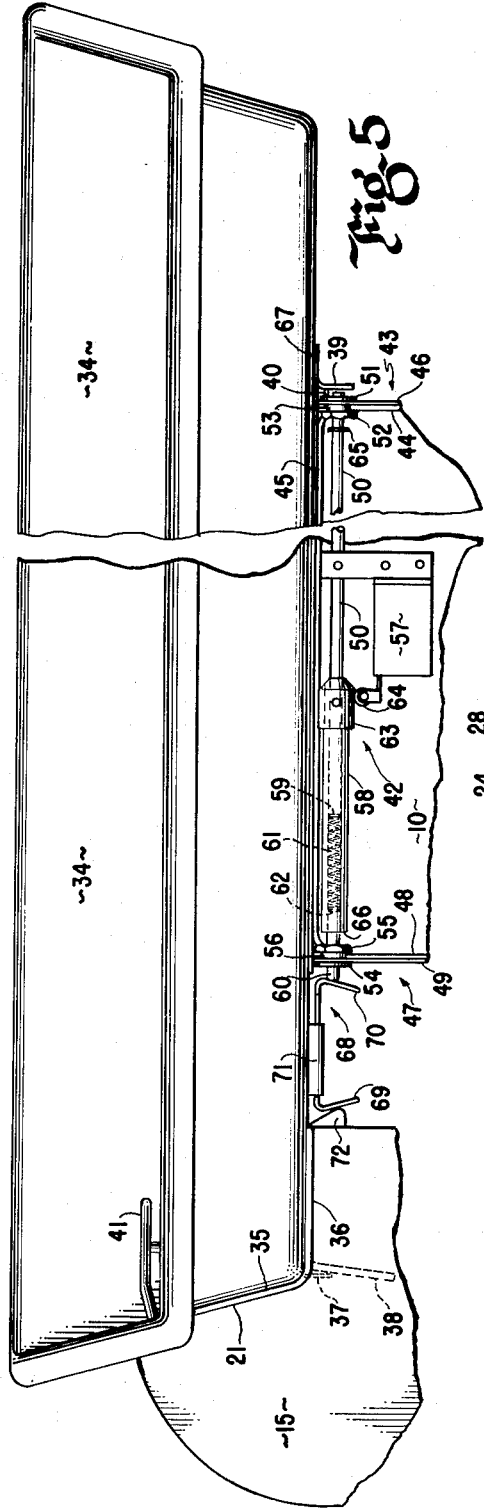
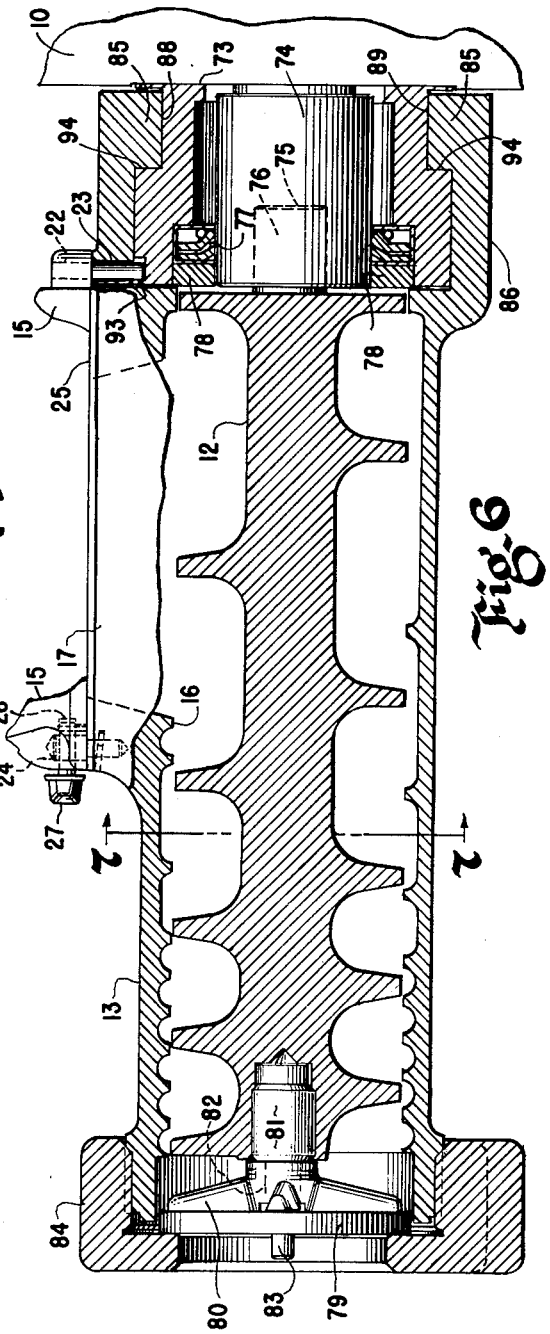
INVENTOR.
HERBERT D. BRAUN
BY
Marshall, Wilson & Yeasting
attorneys Nov. 2, 1965 H. D. BRAUN 3,215,180
FOOD CHOPPER Filed April 22, 1963 3 Sheets-Sheet 3

INVENTOR.
HERBERT D. BRAUN
BY
Marshall, Wilson & Yeasting
~attorneys~

3,215,180
FOOD CHOPPER
Herbert D. Braun, Toledo, Ohio, assignor to Toledo Scale
Corporation, Toledo, Ohio, a corporation of Ohio
Filed Apr. 22, 1963, Ser. No. 274,670
1 Claim. (Cl. 146—182)

This invention relates to machines for comminuting food and particularly to improved means for attaching a chopper cylinder or bowl to a stationary part of the chopper.

Machines for comminuting food are usually equipped with a single feeding screw or worm which extends through a cylindrical feeding barrel having fluted walls. The food is inserted into one end of the feeding barrel and rotation of the feeding worm on its longitudinal axis feeds the food through the feeding barrel and against a perforated plate which closes the other end of the feeding barrel. The pressure exerted on the food by the feeding worm forces it against the face of the perforated plate and causes small protuberances of food to extend into and through the perforations. A rotary knife, mounted on the end of the feeding worm, revolves cutting off small nodules of food.

The usual attachment of the cylindrical feeding barrel to a gear case front head in prior machines includes several nuts which frequently become dangerously loose during operation of the machines. Also, such nuts must be loosened or removed and retightened or replaced many times, because the feeding barrel must be removed from the gear case front head often for cleaning.

Another prior attachment of the cylindrical feeding barrel to a stationary member is shown in U.S. Patent No. 3,036,615 issued May 29, 1962 to Sol Gutfreund and includes cooperating hook members on vertical faces of the feeding barrel and stationary member. This attachment has the advantage of no nuts to become loose but has several disadvantages which include structure too weak for use in high-powered machines and the requirement that there be room on the vertical faces of the feeding barrel and stationary member for the hook members. No such room is available in high-powered machines which have most of the vertical face of the gear case front head taken up by a working part and a bearing oil seal. The chopper disclosed in the above patent is about a one horse power machine. In contrast, modern high capacity choppers are in the range of about five to ten horse power.

The objects of this invention are to overcome the difficulties found in the aforementioned prior machines, to improve food comminuting machines, to increase the capacity of such machines, to increase the speed of operation of such machines, to facilitate the handling and the cleaning of such machines, to increase the safety of operation of such machines, to simplify the construction of such machines, and to simplify the operation of such machines.

One embodiment of this invention enabling the realization of these objects is a machine for comminuting food having an improved feed cylinder to front head attachment and an improved interlock for preventing operation of the machine unless the feed cylinder, a feed pan and a chute connecting the pan to the barrel are properly assembled in such a manner that the operator cannot come into contact with the feeding screw or worm.

One feature of this invention resides in the rugged nature of the feed cylinder to front head attachment which does not utilize nuts and yet is safe, easy to operate and of simple construction. The attachment includes two bosses inside the feed cylinder which clear two flats on the gear case front head when the feed cylinder is turned ninety degrees out of its usual orientation and slipped over the front head. This locates the bosses at an annular groove in the front head. The cylinder is then turned until a pin on the front head engages one of the cylinder bosses, locating the cylinder in operative position. A pin on the chute extends through a hole in the cylinder and is received in a hole in the front head to prevent the cylinder from rotating when the machine's end ring at the discharge end of the cylinder is tightened. Tight engagement of the cylinder bosses in the front head groove is produced by tightening up the end ring. Such engagement is made even tighter when the machine is operated, the food being comminuted increasing the pressure in the cylinder and forcing the end ring forward and the feeding screw backward to thereby increase the pressure of the cylinder bosses against a vertical side of the front head groove.

Another feature resides in the design of the feed cylinder to front head attachment which is independent of the vertical front face of the gear case front head that in high capacity machines is taken up for the most part by a working part and a bearing oil seal. This design, accordingly, is particularly well suited for use in high capacity machines in the range of about five to ten horse power.

Still another feature resides in the simplicity of the interlock which, nevertheless, is fool proof giving complete protection to the machine operator against getting his hand caught in the feed screw. The feed cylinder, pan and chute must be properly assembled before the machine can be started, the control including only a single interlock switch in contrast to the two switches utilized in prior interlocks in machines having two-part feeding cylinders or bowls.

The above and other objects and features of this invention will be appreciated more fully from the following detailed description when read with reference to the accompanying drawings wherein:

FIG. 5 is an enlarged, side elevational view of the upper part of the machine shown in FIG. 1 with part of the housing broken away to reveal mechanism in the interior;

FIG. 6 is an enlarged, vertical sectional view taken along the line 6—6 of FIG. 2.

Figure 1:
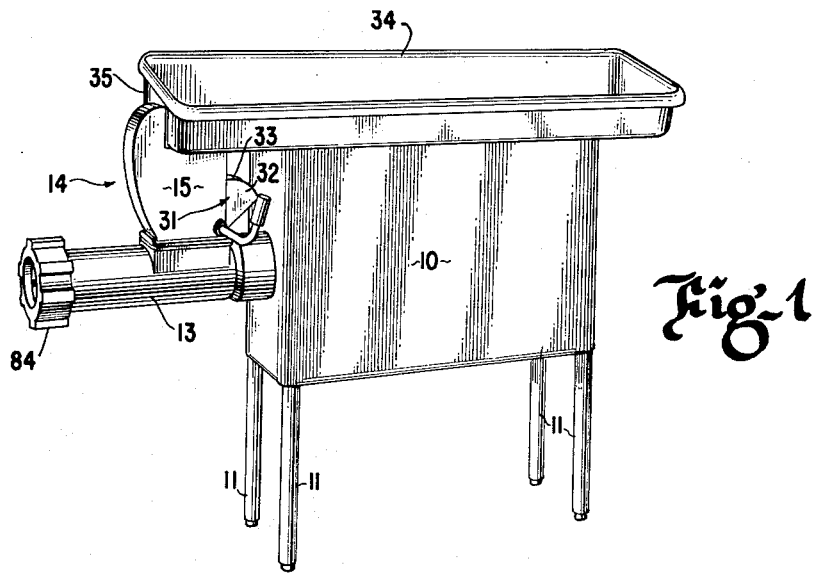
FIG. 1 is a perspective view of a machine for comminuting food which is equipped with the feed cylinder to front head attachment and the safety interlock according to this invention.
Figure 3:
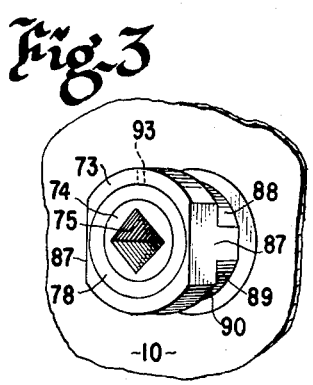
FIG. 3 is an enlarged, fragmentary view showing the gear case front head which is covered up by the feed cylinder shown in FIG. 2 as it appears when the feed cylinder is removed from the machine.

Referring to the drawings, the machine for comminuting food includes a housing 10, supported on four legs 11, containing driving means for a feeding worm or feed screw 12 rotatably mounted in a feed cylinder 13 or lower piece of a two-piece bowl 14 to carry a commodity initially fed into a feed chute or upper piece 15 of the two-piece bowl 14 toward the discharge end of the feed cylinder 13 where the commodity is comminuted. Spiral flutes 16 are formed integrally with the inner surface of the feed cylinder 13 to assist the feed screw 12, the feed cylinder being provided with an ingress opening 17 for the reception of the commodity to be comminuted.

Figure 2:
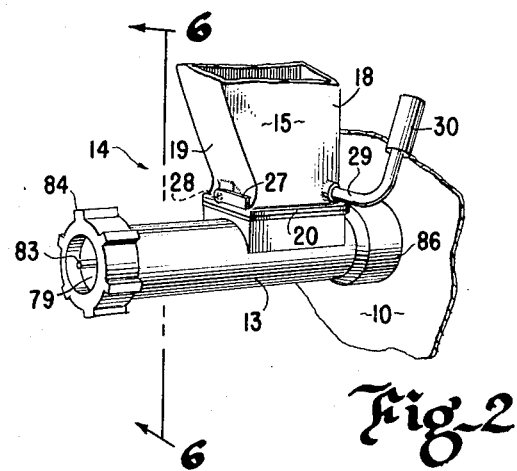
FIG. 2 is an enlarged, fragmentary view of the feed cylinder and its feeding chute illustrated in FIG. 1.

The upper bowl piece 15 functions as a chute for carrying the commodity to be comminuted to the lower bowl piece or feed cylinder 13 and compromises two generally flat and parallel side walls 18 and a front wall 19 which extend upwardly from a foot 20 defining an egress opening of a size and shape corresponding to the size and shape of the ingress opening 17 in the feed cylinder 13. An open mouth, defined by a rim 21, at the top of the chute 15 receives pieces of commodity which fall down the chute into the feed cylinder 13. The chute 15 carries a pin 22 which extends through a vertical hole 23 in the top of the feed cylinder 13 and is provided with a hole that receives a vertical pin 24 extending upwardly from the top of the feed cylinder to detachably mount the chute 15 on the feed cylinder 13. When the chute 15 and the feed cylinder 13 are together, the foot 20 of the chute 15 rests upon a corresponding horizontal ledge 25 of the feed cylinder 13. The bowl 14 because it is constructed from two pieces is easy to handle and clean. Little effort is needed to lift the upper bowl piece or chute 15 from the feed cylinder to dismantle the bowl. The chute 15 is latched in place by means of an ordinary cam lock which includes the vertical pin 24, provided with a notch 26, and a handle 27 on a rotatably mounted, horizontal, notched pin 28 (FIG. 2). When the cam lock is latched as shown in FIGS. 1 and 2, the rotatable notched pin 28 is received in the pin notch 26 and when the cam lock is unlatched, by turning the handle 27 one-half revolution counterclockwise as viewed in FIGS. 1 and 2, the notch in the rotatable pin 28, which notch is not shown but that is like the pin notch 26, is juxtaposed to the pin notch 26.

A shaft 29, extending generally parallel to the front wall 19 of the chute 15, is pivotally mounted in the side walls 18 of the chute 15 and has an extension 30 which functions as a handle. A stomper 31, which is a hollow member having a flat front wall, that in the position shown in FIG. 1 forms part of the rear wall of the chute 15, two flat side walls 32 and a curved upper wall 33, is secured to the rotatable schaft 29. Should the commodity to be comminuted get stuck in the chute 15 or at least does not feed properly, the stomper 31 is pivoted by means of manually applied force on the handle 30 to engage the front stomper wall with the commodity forcing the commodity down into the feed crew 12.

The commodity to be comminuted is piled in an end feed pan 34 and is pushed by hand out of an egress opening in an end wall 35 of the pan which opening is not shown but which coincides with the chute opening defined by the chute rim 21. The bottom of the feed pan 34 is supported on the top of the housing 10 and on a shelf 36 extending horizontally from the chute 15. Longitudinal movement of the pan 34 to the left as viewed in FIG. 5 is prevented by the chute rim 21 and to the right is prevented by engagement of a down-turned lip 37 on the pan 34 with a baffle 38 in the chute 15, and transverse movement of the pan 34 is prevented by engagement of a bifurcated bracket 39 on the pan 34 with a member 40 extending from the housing 10 and between the bifurcations.

A guard 41 in the form of a wire grid is provided at the feed opening in the end wall 35 of the pan 34 to prevent one form reaching down the chute 15 far enough to touch the feed screw 12. The physical sizes of the chute 15 and the guard 41 are such that one cannot reach down the chute 15 and touch the feed screw 12.

An interlock 42 is provided for preventing operation of the machine unless the feed cylinder 13, chute 15 and pan 34 are properly assembled in such a manner that the operator cannot come into contact with the feed screw 12. The housing 10 includes a rear wall 43, comprising a leg 44 of a U-shaped support member 45 and a thin sheet metal cover 46 on the leg 44, and a front wall 47, comprising the other leg 48 of the U-shaped support member 45 and a thin sheet metal cover 49 on the leg 48. A slidable rod 50 is mounted inside the housing 10, the right hand end of the rod 50 as viewed in FIG. 5 being slidably mounted in a bushing 51 that extends through the thin sheet metal cover 46 and has a threaded end on which a nut 52 is threaded, there being a washer 53 between the nut 52 and the metal cover 46 forcing the cover tightly against the bushing 51, and the left hand end of the rod 50 being similarly slidably mounted by means of a stud 60, carried indirectly by the rod 50 as hereinafter described, having an end slidable in a bushing 54 that extends through the thin sheet metal cover 49 and has a threaded end on which a nut 55 is threaded, there being a washer 56 between the nut 55 and the metal cover 49 forcing the cover tightly against the bushing 54. The slidable rod 50 is a part of the safety interlock 42.

The slidable rod 50 carries an interlock switch 57 which must be closed in order to start the motor of the above driving means and a tube 58 sleeved over the left hand end of the rod 50, the left hand end of the rod 50 being indicated by the numeral 59. The switch 57 moves together as one with the rod 50 but the tube 58 is slidable on the rod 50. A spring 61 inside the tube 58 is compressed between the rod end 59 and an end 62 of the stud 60 which is fixed in the tube 58 and which has its other end slidable in the bushing 54 as above described. A switch operator 63, fixed to the right hand end of the tube 58 and, thus, movable relative to the rod 50, is engageable with a switch-operating roller 64 of the interlock switch 57. The rod 50 is slidable to the right until a ring 65 carried by the rod 50 engages the nut 52. The tube 58 is slidable to the left until its left end 66 engages the nut 55. The bifurcated bracket 39 in addition to engaging the member 40 to prevent transverse movement of the pan 34 also is engageable with the right hand end of the slidable rod 50 as shown in FIG. 5, the bracket 39 being carried by a reinforcement member 67 on the bottom of the pan 34. The reinforcement member 67 rests upon the upper edges of the thin sheet metal front and back covers 49 and 46 and upon the U-shaped housing member 45. A slide 68 having down-turned ends 69 and 70 is slidable in a bracket 71 carried by the bottom of the feed pan 34 and is pushed to the right by a cam 72 carried by the chute 15 when the feed pan 34 is put in place.

As shown in FIG. 5, the switch operator 63 is in engagement with the roller 64 closing the interlock switch 57 to condition the motor for operation. In order to disassemble the machine for cleaning, the feed pan 34 first is lifted from the machine. This moves the guard 41 out of its operative guarding position, since the guard is carried by the feed pan. However, removal of the feed pan 34 from the machine allows the spring 61 to push the slidable rod 50 to the right as viewed in FIG. 5 until the ring 65 engages the nut 52 and the tube 58 to the left until the tube end 66 engages the nut 55 disengaging the switch operator 63 from the switch roller 64. The interlock safety switch 57 then opens and the machine cannot be started accidentally. The chute 15 then is removed from the feed cylinder 13 as described above and then the feed cylinder is removed from the machine as described hereinafter. The safety switch 57 cannot be closed until the feed cylinder 13, the chute 15 and the feed pan 34 are properly assembled.

To assemble the above disassembled parts, the feed cylinder 13 must be put in place first because it serves to support the chute 15. Normally, the chute 15 is put in place next, but should the feed pan 34 be put in place before the chute 15, the switch operator 63 cannot close the switch 57 because it is necessary that the cam 72 which is carried by the chute 15 be in position before the switch 57 can be closed. Hence, the chute 15 is put in place next and the cam lock is locked by means of the handle 27 (FIG. 2). This locates the cam 72 in its position shown in FIG. 5. The feed pan 34 then is put in place, the bracket 39 carried by the pan 34 pushing the slidable rod 50 in opposition to the spring 61 into its position shown in FIG. 5 with the ring 65 spaced from the nut 52 and the cam 72 pushing the slide end 69 into its position shown in FIG. 5 wherein the slide end 70 pushes the stud 60 and the tube 58 fixed thereto in opposition to the spring 61 into their positions shown in FIG. 5 with the tube end 66 spaced from the nut 55. Such movement of the slidable rod 50 to the left causes the rod end 59 to compress the spring 61 and carries the safety switch 57 into the position shown. However, until the feed pan 34 is moved into its proper place the switch operator 63 does not engage the switch roller 64. Such movement of the tube 58 to the right causes the stud end 62 to compress the spring 61 further and carries the switch operator 63 into the position shown closing the switch 57. Accordingly, the switch 57 cannot be closed until it is moved to the left by the back end of the pan 34 being properly positioned and until the switch operator 63 is moved to the right by the front end of the pan 34 being properly positioned.

The feed cylinder 13, chute 15, and pan 34 must be properly assembled before the machine can be started. The safety control features only a single interlock switch in contrast to the two switches utilized in prior interlocks in choppers having two-part bowls. Even though the interlock of the invention is of superior simplicity it nevertheless is fool proof giving complete protection to the machine operator against getting his hand caught in the feed screw. The single switch 57 protects the operator when either the pan 34 or the chute 15 (or both) is removed from the machine.

Another feature resides in the rugged nature of the feed cylinder to front head attachment which does not utilize nuts and yet is safe, easy to operate and of simple construction. The motor which is conditioned for operation by the closing of the safety switch 57 drives the feed screw 12 through conventional gearing contained in a gear case having a stationary cylindrical front head 73 extending through the front wall of the housing 10, the gearing being operatively connected to the feed screw 12 by means of a member 74 provided with a square hole 75 that receives an easily detachable tenon 76 extending from the feed screw 12. In the gear case front head 73, the member 74 is rotatably mounted in a needle bearing 77 which is held in place by means including a stationary oil seal 78. The food is inserted through the ingress opening 17 into the feed cylinder 13 and rotation of the feed screw 12 on its longitudinal axis feeds the food through the feed cylinder and against a stationary perforated plate 79 which closes the end of the feed cylinder. The pressure exerted on the food by the feed screw 12 forces it against the face of the perforated plate 79 and causes small protuberances of food to extend into and through the perforations. A rotary knife 80, mounted on the end of the feed screw 12, revolves cutting off small nodules of food. A stud 81 fixed in such end of the feed screw 12, having a square portion 82 received in a correspondingly shaped opening in the knife 80, drives the knife 80. The stud 81 also has a round extension 83 which extends through a correspondingly shaped opening in the perforated plate 79 for support. An end ring 84 threaded on the end of the feed cylinder 13 forces the perforated plate 79 against the knife 80, the knife 80 in turn against the stud 81, and the feed screw tenon 76 in turn into the hole 75 in the driving member 74.

Figure 4:
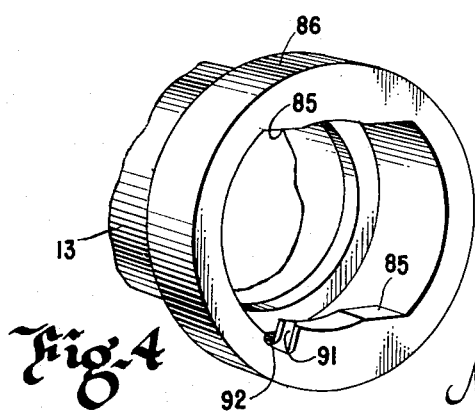
FIG. 4 is an enlarged, fragmentary view showing the feed cylinder shown in FIG. 2 as it appears when it is removed from the machine.

The feed cylinder to front head attachment releasably secures the cylinder upon the front head and includes two bosses or latch members 85 opposite each other on the inside of an enlarged hollow end portion 86 of the feed cylinder 13, the end cylinder portion 86 being large enough to fit snugly over the gear case front head 73. The two bosses 85 clear two vertical flats 87 on the gear case front head 73 when the feed cylinder 13 is turned ninety degrees out of its usual orientation and slipped over the gear case front head 73. As viewed in FIG. 7, the ingress opening 17 in the feed cylinder 13 opens to the right when the feed cylinder 13 is turned the above ninety degrees out of its usual orientation. When the bosses 85 are slipped over the gear case front head 73 as far as they will go, i.e., slid along the flats 87, the bosses 85 are located at an annular circumferential groove in the front head 73 which groove is divided into an upper section 88 and a lower section 89 by the intersecting planes of the flats 87. The feed cylinder 13 then is turned counterclockwise as viewed in FIG. 7 until a pin 90 in the lower groove section 89 on the front head 73 is engaged by the lower one of the bosses 85 as seen in FIG. 4, the pin 90 being received in a groove 91 (FIG. 4) in such boss 85, to locate the feed cylinder 13 in operative position. The groove 91 in the lower boss 85 is formed by drilling a hole 92 (FIGS. 4 and 7) through the feed cylinder 13 at an end of the boss, the hole 92 functioning to form the grooved seat for the pin 90, as a drain hole and as a hole to receive a turning tool should the feed cylinder 13 be stuck when it is desired to remove it.

Figure 7:
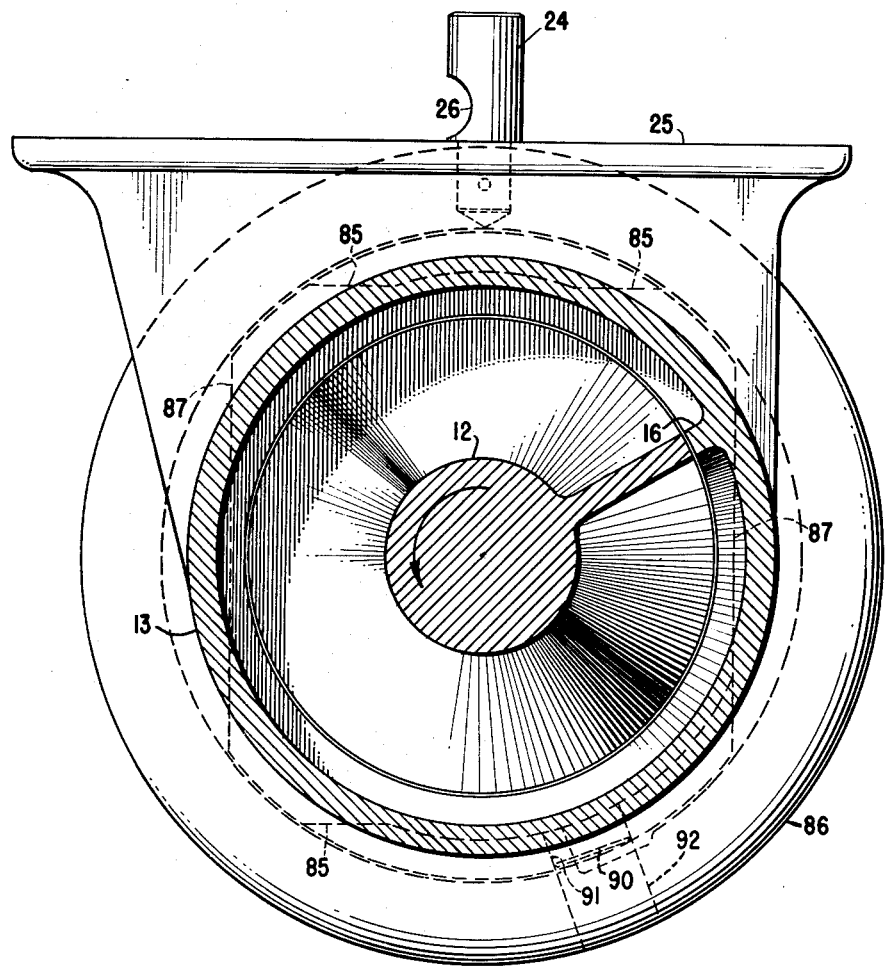
FIG. 7 is an enlarged, vertical sectional view taken along the line 7—7 of FIG. 6.

The pin 22 on the chute 15 which extends through the hole 23 in the feed cylinder 13 is received in a hole 93 in the top of the gear case front head 73 to prevent the feed cylinder 13 from rotating clockwise as viewed in FIG. 7 when the end ring 84 is tightened. Tight engagement of the cylinder bosses 85, at horizontal surfaces 94 on the bosses 85, in the front head groove is produced by tightening up the end ring 84. Such engagement is made even tighter when the machine is operated, the food being comminuted increasing the pressure in the feed cylinder 13 and forcing the end ring 84 forward and the feed screw 12 backward to thereby increase the pressure of the cylinder boss surfaces 94 against the side of the front head groove.

To assemble: The feed cylinder 13 is slipped over the gear case front head 73 as described above and then is turned until the stationary pin 90 on the front head 73 is received in the groove 91 in the lower cylinder boss 85 to locate the feed cylinder 13 in operative position. Then the feed screw 12 is so inserted in the cylinder 13 that the screw tenon 76 is received in the hole 75 in the driving member 74, the knife 80 and the perforated plate 79 are slipped in place on the free end of the feed screw 12 as shown in FIG. 6, and the end ring 84 is turned (not tightly) on the threaded end of the feed cylinder 13. Then the chute 15 is so positioned on top of the feed cylinder 13 that the pin 22 carried by the chute 15 extends through the cylinder hole 23 and is received in the front head hole 93 to prevent the feed cylinder from rotating when the end ring 84 is tightened, and the pin 24 extending upwardly from the top of the feed cylinder is received in the hole in the chute to detachably mount the chute on the feed cylinder. The cam lock handle 27 is turned to lock the chute 15 in place and the end ring 84 is tightened as tight as it can be by hand. Finally, the feed pan 34 is positioned as described above.

The feed cylinder to front head attachment is very strong, there being plenty of metal in the bosses 85 and in the metal of the front head 73 ahead of the bosses to withstand the large force at the boss surfaces 94, and, accordingly, is safe. The attachment permits quick and easy assembly and disassembly, is of simple construction and does not utilize nuts which frequently become dangerously loose during operation of prior machines.

Another feature resides in the design of the feed cylinder to front head attachment which is independent of the vertical front face of the gear case front head 73 that is taken up for the most part by the driving member 74 and the oil seal 78. This design, accordingly, is particularly well suited for use in high capacity machines in the range of about five to ten horsepower which ordinarily have little or no room on the vertical front faces of their gear case front heads for attachments.

It is to be understood that the above description is illustrative of this invention and that various modifications thereof can be utilized without departing from its spirit and scope.

Having described the invention, I claim:

In a machine for comminuting food, in combination, a housing, a stationary head member extending from the housing, a feed cylinder within which the food is comminuted having a hollow end of a size to fit over the head, the head defining a circumferential groove and a flat which intersects the groove, a member on the inside of the hollow cylinder end receivable in the groove for releasably securing the cylinder upon the head, a stationary stop carried by the head, the cylinder being attached to the head by slipping the cylinder end over the head when the cylinder is so oriented that the member and the flat are aligned and then rotating the cylinder until the stop is engaged by the member to locate the cylinder in operative position, the cylinder and the head defining openings which are aligned when the cylinder is in operative position, and a movable pin in the openings to prevent rotation of the cylinder during assembly of the machine.

References Cited by the Examiner

UNITED STATES PATENTS

| | | | |
|---|---|---|---|
| 2,043,216 | 6/36 | Van Hooydonk | 146—67 |
| 2,161,501 | 6/39 | Blackmon. | |
| 2,508,460 | 5/50 | Latham | 146—67 |
| 2,539,448 | 1/51 | Lundell | 146—182 |
| 2,665,724 | 1/54 | Lundell. | |
| 2,965,145 | 12/60 | Gutfreund | 146—182 |

FOREIGN PATENTS 845,841    8/52    Germany.

J. SPENCER OVERHOLSER, *Primary Examiner.*